US011760197B1

United States Patent
Matsuno et al.

(10) Patent No.: US 11,760,197 B1
(45) Date of Patent: Sep. 19, 2023

(54) DRIVING FORCE ESTIMATION APPARATUS

(71) Applicant: SUBARU CORPORATION, Tokyo (JP)

(72) Inventors: Koji Matsuno, Tokyo (JP); Yoshiki Shima, Tokyo (JP); Masahiro Saito, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/188,757

(22) Filed: Mar. 23, 2023

(30) Foreign Application Priority Data

May 17, 2022 (JP) .................................. 2022-080830

(51) Int. Cl.
*B60K 23/08* (2006.01)
*B60K 17/35* (2006.01)

(52) U.S. Cl.
CPC .......... *B60K 23/0808* (2013.01); *B60K 17/35* (2013.01); *B60K 2023/0816* (2013.01)

(58) Field of Classification Search
CPC ............... B60K 23/0808; B60K 17/35; B60K 2023/0816
See application file for complete search history.

(56) References Cited

FOREIGN PATENT DOCUMENTS

| CN | 102267460 B | * | 7/2013 |
| CN | 103057436 B | * | 7/2015 |
| GB | 2519633 A | * | 4/2015 |
| JP | H05-319124 A | | 12/1993 |
| JP | H08230647 A | | 9/1996 |
| JP | 2003-118420 A | | 4/2003 |
| JP | 2020-121707 A | | 8/2020 |
| JP | 2020145805 A | * | 9/2020 |

* cited by examiner

*Primary Examiner* — Justin Holmes
(74) *Attorney, Agent, or Firm* — McDermott Will & Emery LLP

(57) ABSTRACT

A driving force estimation apparatus includes a free rolling rotation speed output unit, an actual rotation speed detector, a slip rate calculation unit, a driving force estimation unit, a slip angle output unit, and a stiffness correction unit. The free rolling rotation speed output unit outputs free rolling rotation speeds of front and rear wheels in a free rolling state devoid of a braking or driving force. The slip rate calculation unit calculates slip rates of the front and rear wheels, from the free rolling rotation speeds and actual rotation speeds. The driving force estimation unit estimates driving forces of the front and rear wheels, using driving or braking stiffnesses of the front and rear wheels and the slip rates. The slip angle output unit outputs slip angles of the front and rear wheels. The stiffness correction unit corrects the driving or braking stiffnesses based on the slip angles.

9 Claims, 12 Drawing Sheets

IN BRAKING

RELATION BETWEEN SPEED OF TIRE AND
SPEED OF ROAD SURFACE IN FREE ROLLING

IN DRIVING

RELATION BETWEEN SPEED OF TIRE AND
SPEED OF ROAD SURFACE IN FREE ROLLING

DISPLAY IN ASSISTING IN STRAIGHT TRAVEL

DISPLAY IN ASSISTING IN CORNERING

DRIVING FORCE ESTIMATION APPARATUS

CROSS-REFERENCE TO RELATED APPLICATIONS

The present application claims priority from Japanese Patent Application No. 2022-080830 filed on May 17, 2022, the entire contents of which are hereby incorporated by reference.

BACKGROUND

The disclosure relates to a driving force estimation apparatus to be applied to a vehicle that drives front wheels and rear wheels.

As an existing technique related to, for example, estimation of a driving force of a four-wheel drive (AWD) automobile, for example, Japanese Unexamined Patent Application Publication (JP-A) No. H08-230647 provides a description that, to accurately detect a two-wheel drive state and a four-wheel drive state without using sensors, etc., a first wheel speed difference detection unit detects that wheel speeds of wheels to which driving torque is transmitted during the two-wheel drive state are greater than wheel speeds of wheels to which the driving torque is not transmitted during the two-wheel drive state. A second wheel speed difference detection unit determines the two-wheel drive state, when detecting that a state has not continued for predetermined time in which the wheel speeds of the wheels to which the driving torque is transmitted during the two-wheel drive state are smaller than the wheel speeds of the wheels to which the driving torque is not transmitted during the two-wheel drive state. Otherwise, the second wheel speed difference detection unit determines the four-wheel drive state.

JP-A No. 2003-118420 provides a description that, to enhance detection accuracy of an actual drive state, in a state in which a lateral motion is occurring on the occasion of, for example, cornering of a vehicle, an actual drive state is determined based on a deviation between an estimated yaw rate value based on a set drive state and an actual yaw rate value.

JP-A No. H05-319124 provides a description that, to enhance travel stability on the occasion of cornering of a vehicle, a radius of cornering of the vehicle is calculated from a steering angle and a vehicle body speed, while slip angles of front wheels and rear wheels are calculated from a yaw rate. From the radius of cornering of the vehicle and the slip angles of the front wheels and the rear wheels, a target speed of movement of each wheel is calculated. From the target speed of movement of each wheel and a wheel speed of each wheel, a slip rate difference of each wheel is calculated. Based on the slip rate difference, braking torque is applied to each wheel, to perform torque distribution to each wheel.

JP-A No. 2020-121707 discloses a torque distribution state display device including a torque distribution state display screen. The torque distribution state display device includes level indicators corresponding to right and left front wheels as main driving wheels and to right and left rear wheels as sub-driving wheels. A torque distribution state between the front wheels and the rear wheels is displayed by a level represented by the number of segments that are lighted in each level indicator.

SUMMARY

An aspect of the disclosure provides a driving force estimation apparatus to be applied to a vehicle. The vehicle is configured to drive front wheels and rear wheels of the vehicle. The driving force estimation apparatus is configured to estimate a driving force of the front wheels and a driving force of the rear wheels. The driving force estimation apparatus includes a free rolling rotation speed output unit, an actual rotation speed detector, a slip rate calculation unit, a driving force estimation unit, a slip angle output unit, and a stiffness correction unit. The free rolling rotation speed output unit is configured to output a free rolling rotation speed of the front wheels and a free rolling rotation speed of the rear wheels in a free rolling state devoid of a braking force or a driving force. The actual rotation speed detector is configured to detect an actual rotation speed of the front wheels and an actual rotation speed of the rear wheels. The slip rate calculation unit is configured to calculate a slip rate of the front wheels and a slip rate of the rear wheels, from the free rolling rotation speed of the front wheels, the free rolling rotation speed of the rear wheels, the actual rotation speed of the front wheels, and the actual rotation speed of the rear wheels. The driving force estimation unit is configured to estimate the driving force of the front wheels and the driving force of the rear wheels with the use of driving stiffnesses or braking stiffnesses of the front wheels, driving stiffnesses or braking stiffnesses of the rear wheels, the slip rate of the front wheels, and the slip rate of the rear wheels. The slip angle output unit is configured to output a slip angle of the front wheels and a slip angle of the rear wheels. The stiffness correction unit is configured to correct the driving stiffnesses or the braking stiffnesses of the front wheels and the driving stiffnesses or the braking stiffnesses of the rear wheels to be used in estimating the driving force of the front wheels and the driving force of the rear wheels by the driving force estimation unit, in accordance with the slip angle of the front wheels and the slip angle of the rear wheels outputted by the slip angle output unit.

An aspect of the disclosure provides a driving force estimation apparatus to be applied to a vehicle. The vehicle is configured to drive front wheels and rear wheels of the vehicle. The driving force estimation apparatus is configured to estimate a driving force of the front wheels and a driving force of the rear wheels. The driving force estimation apparatus includes an actual rotation speed sensor and circuitry. The actual rotation speed sensor is configured to detect an actual rotation speed of the front wheels and an actual rotation speed of the rear wheels. The circuitry is configured to output a free rolling rotation speed of the front wheels and a free rolling rotation speed the rear wheels in a free rolling state devoid of a braking force or a driving force. The circuitry is configured to calculate a slip rate of the front wheels and a slip rate of the rear wheels, from the free rolling rotation speed of the front wheels, the free rolling rotation speed of the rear wheels, the actual rotation speed of the front wheels, and the actual rotation speed of the rear wheels. The circuitry is configured to estimate the driving force of the front wheels and the driving force of the rear wheels with the use of driving stiffnesses or braking stiffnesses of the front wheels, driving stiffnesses or braking stiffnesses of the rear wheels, the slip rate of the front wheels, and the slip rate of the rear wheels. The circuitry is configured to output a slip angle of the front wheels and a slip angle of the rear wheels. The circuitry is configured to correct the driving stiffnesses or the braking stiffnesses of the front wheels and the driving stiffnesses or the braking stiffnesses of the rear wheels to be used in estimating the driving force of the front wheels and the driving force of the rear wheels, in accordance with the of the front wheels and the slip angle of the rear wheels.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
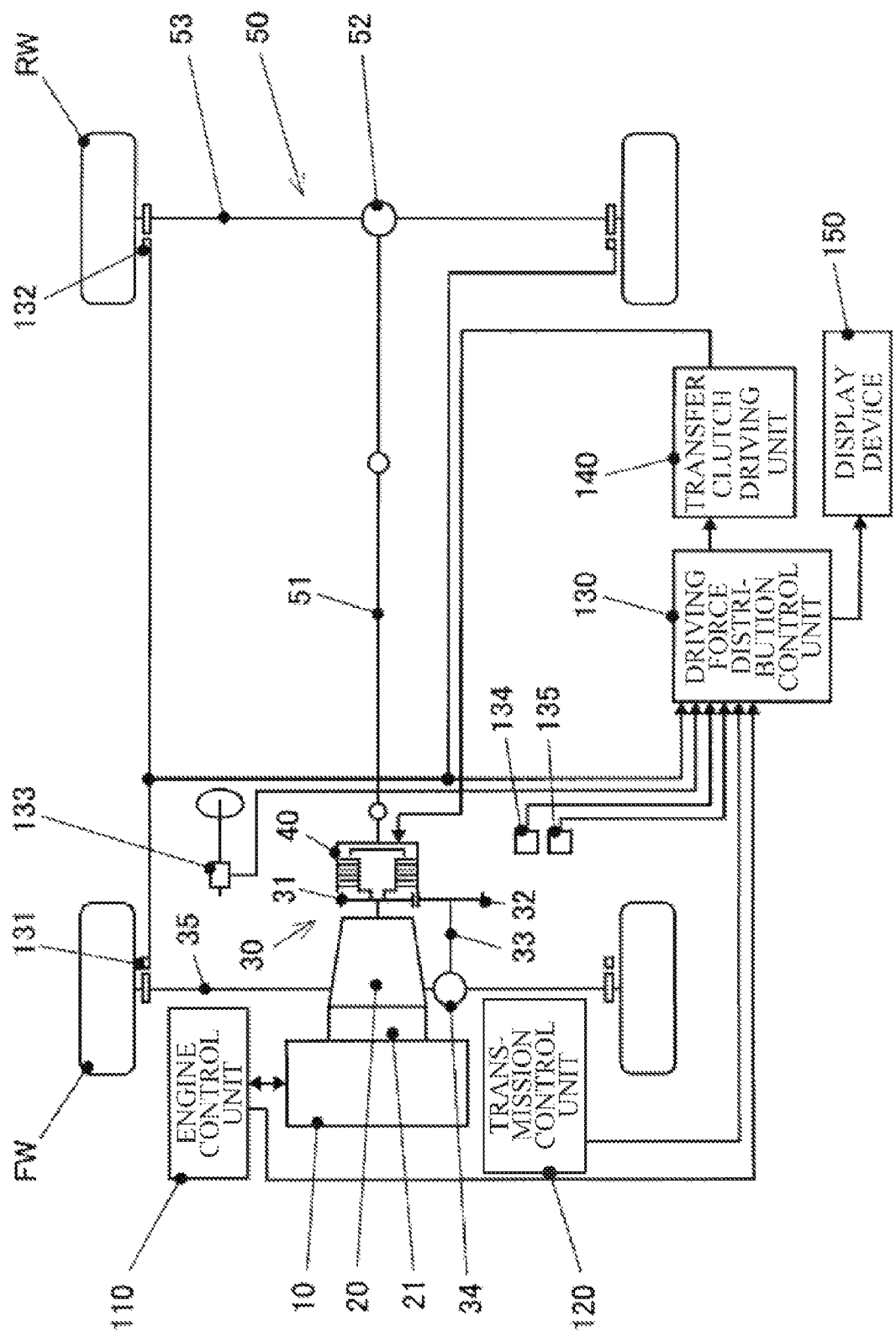
FIG. 1 is a schematic configuration diagram of a drivetrain of a vehicle including a driving force estimation apparatus according to an embodiment of the disclosure.

JP-A No. H08-230647 provides a description that, based on a wheel speed difference of each wheel, a determination is made as to whether or not the relevant wheel is in the drive state. JP-A No. 2003-118420 describes a determination method based on whether a cornering state of a vehicle, i.e., a yaw rate, conforms to a drive state, i.e., switching between two-wheel drive and four-wheel drive, to cope with changes in a wheel speed difference because of cornering of a vehicle, and vibrations of the wheel speed because of interference by a drivetrain.

However, some four-wheel vehicles include a mechanism, or make a control, of continuously changing driving force distribution between front and rear wheels, inclusive of the two-wheel drive state. Thus, such an alternative determination as to whether or not each wheel is in the drive state is insufficient to estimate the drive state.

It is desirable to provide a driving force estimation apparatus that makes it possible to appropriately estimate a drive state.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

A driving force estimation apparatus according to an embodiment is configured to estimate a driving force of each wheel in, for example, a four-wheel drive automobile. The four-wheel drive automobile is configured to drive right and left front wheels and right and left rear wheels, and continuously change driving force distribution between the front wheels and the rear wheels.

FIG. 1 schematically illustrates a configuration of a drivetrain of a vehicle on which the driving force estimation apparatus according to the embodiment is mounted.

The vehicle 1 may include, for example, right and left front wheels FW in a pair, right and left rear wheels RW in a pair, an engine 10, a transmission 20, a front wheel driving force transmission mechanism 30, a transfer clutch 40, a rear wheel driving force transmission mechanism 50, an engine control unit 110, a transmission control unit 120, a driving force distribution control unit 130, a transfer clutch driving unit 140, and a display device 150.

The engine 10 is a travel power source of the vehicle.

As the engine 10, for example, a four-stroke gasoline engine may be used.

It is to be noted that the travel power source of the vehicle 1 is not limited to the engine 10. The travel power source of the vehicle 1 may include an engine-electric hybrid system including the engine 10 a motor generator, or alternatively, the travel power source of the vehicle 1 may include solely a motor generator.

The transmission 20 may include a transmission mechanism configured to reduce or increase a rotation speed of an output shaft of the engine 10 at a predetermined shifting ratio.

The transmission mechanism may include, for example, a CVT (continuously variable transmission) variator of, for example, a chain type or a belt type, or multiple planetary gear sets, without limitation.

Between the engine 10 and the transmission 20, a torque converter 21 is provided.

The torque converter 21 is a fluid coupling that serves as a starting device configured to cause starting at a vehicle speed of zero.

The torque converter 21 may include a lock-up clutch configured to restrain relative rotation between an input unit, i.e., an impeller, and an output unit, i.e., a turbine, under predetermined conditions.

The front wheel driving force transmission mechanism 30 is a motive power transmission mechanism configured to transmit rotation of an output shaft of the transmission 20 to the right and left front wheels FW.

The front wheel driving force transmission mechanism 30 may include, for example, a drive gear 31, a driven gear 32, a pinion shaft 33, a front differential 34, and front drive shafts 35.

The drive gear 31 and the driven gear 32 are a pair of helical gears provided on parallel axes.

The drive gear 31 is directly coupled to the output shaft of the transmission 20.

The driven gear 32 is provided on the pinion shaft 33.

The pinion shaft 33 is a rotation axis configured to transmit, to the front differential 34, torque transmitted from the transmission 20 through the drive gear 31 and the driven gear 32.

The pinion shaft 33 may include a pinion gear configured to transmit a driving force to an unillustrated ring gear provided on an outer periphery of the front differential 34.

The pinion gear of the pinion shaft 33 and the ring gear of the front differential 34 may serve as a final reduction gear.

The front differential 34 is a differential mechanism configured to transmit, to the right and left front drive shafts 35, the driving force transmitted from the pinion shaft 33, and absorb a difference in a rotation speed between the right and left front wheels FW.

The front drive shafts 35 are rotation axes configured to transmit the driving force from the front differential 34 to the right and left front wheels FW.

The front drive shafts 35 may include, for example, a universal joint configured to change a direction of rotation, to follow strokes of suspensions and steering of the front wheels FW.

The transfer clutch 40 is a fastening element provided between the output shaft of the transmission 20 and a front end of a propeller shaft 51 of the rear wheel driving force transmission mechanism 50.

The transfer clutch 40 may include a wet multi-plate clutch of, for example, a hydraulic type or an electromagnetic type. The wet multi-plate clutch is configured to change the torque transmitted from the output shaft of the transmission 20 to the propeller shaft 51, by adjusting a restraining force.

The transfer clutch 40 is configured to continuously change the restraining force between a front shaft and a rear shaft, from a locked state, i.e., a directly coupled state, to a free state, i.e., a released state. The front shaft is coupled to the output shaft of the transmission 20. The rear shaft is coupled to the front end of the propeller shaft 51. In the free state, no torque is transmitted except for friction that inevitably occurs.

The drive gear 31, the driven gear 32, the pinion shaft 33, the front differential 34, and the transfer clutch 40 of the front wheel driving force transmission mechanism 30 may be housed in an unillustrated transmission case. The transmission case may be a housing common to the transmission 20.

The rear wheel driving force transmission mechanism 50 is a motive power transmission mechanism configured to transmit, to the right and left rear wheel RW, the rotation of the output shaft of the transmission 20 transmitted through the transfer clutch 40.

The rear wheel driving force transmission mechanism 50 may include, for example, the propeller shaft 51, a rear differential 52, and rear drive shafts 53.

The propeller shaft 51 is a rotation axis configured to transmit the driving force from the rear shaft of the transfer clutch 40 to the rear differential 52.

The rear differential 52 is a differential mechanism configured to transmit, to the right and left rear drive shafts 53, the driving force transmitted from the propeller shaft 51, and absorb a difference in a rotation speed between the right and left rear wheels RW.

The rear differential 52 may include a final reduction gear configured to reduce a rotation speed of the propeller shaft 51 at a predetermined final reduction ratio, and transmit the resultant rotation speed to the rear drive shafts 53.

The rear drive shafts 53 are rotation axes configured to transmit the driving force from the rear differential 52 to the right and left rear wheels RW.

The rear drive shafts 53 may include, for example, a universal joint configured to convert a direction of rotation, to follow strokes of suspensions.

The engine control unit 110 is a device configured to comprehensively control the engine 10 and its auxiliaries.

The engine control unit 110 is configured to set request torque in accordance with, for example, an amount of an accelerator operation by the driver, and control an output of the engine 10 to allow actual torque to match the request torque. The actual torque is torque to be actually generated by the engine 10.

The engine control unit 110 is configured to transmit an estimated value of the actual torque of the engine 10 to the driving force distribution control unit 130. The estimated value of the actual torque usually matches the request torque.

The transmission control unit 120 is a device configured to comprehensively control the transmission 20 and its auxiliaries.

The transmission control unit 120 is configured to control a shifting ratio in the transmission 20 and a fastening force of the lock-up clutch in the torque converter 21.

The transmission control unit 120 is configured to transmit, to the driving force distribution control unit 130, data regarding the shifting ratio in the transmission 20 and a torque ratio when the torque converter 21 generates a torque amplification effect.

The driving force distribution control unit 130 is a device configured to control a fastening force of the transfer clutch 40 through the transfer clutch driving unit 140, to control driving force distribution between the front and rear shafts.

The driving force distribution control unit 130 is configured to set a target value of the front-rear driving force distribution in accordance with a current travel state of the vehicle 1, e.g., an acceleration or deceleration state and a state of cornering, and control the fastening force of the transfer clutch 40 in accordance with the target value.

In one embodiment of the disclosure, the driving force distribution control unit 130 may serve as a driving force estimation apparatus configured to estimate the current driving forces of the front wheels FW and the rear wheels RW in real time.

Furthermore, in one embodiment of the disclosure, the driving force distribution control unit 130 may serve as a free rolling speed output unit, a slip rate calculation unit, a driving force estimation unit, a slip angle output unit, a stiffness correction unit, and a driving force distribution control change unit. Details of these units is described later.

To the driving force distribution control unit 130, for example, vehicle speed sensors 131 and 132, a steering angle sensor 133, an acceleration rate sensor 134, and a yaw rate sensor 135 may be coupled.

The vehicle speed sensors 131 and 132 are sensors configured to output vehicle speed signals respectively corresponding to rotation speeds, or angular velocities, of the front wheels FW and the rear wheels RW.

The vehicle speed sensors 131 and 132 may be provided in respective hubs configured to rotatably support the front wheels FW and the rear wheels RW.

The vehicle speed sensors 131 and 132 may be respectively provided on the right and left front wheels FW, and the right and left rear wheels RW.

The steering angle sensor 133 is a sensor configured to detect a steering wheel angle θH. The steering wheel angle θH is an angular position of a steering wheel with which an occupant, e.g., a driver who drives the vehicle 1, makes a steering operation.

The driving force distribution control unit 130 is configured to calculate a steering angle of the front wheels FW based on the steering wheel angle θH detected by the steering angle sensor 133 and a gear ratio n of an unillustrated steering gearbox. The gear ratio n is a constant.

The acceleration rate sensor 134 is a sensor configured to detect a longitudinal acceleration rate and a lateral, or vehicle-widthwise, acceleration rate that act on a vehicle body.

The yaw rate sensor 135 is a sensor configured to detect a yaw rate, i.e., a rotation speed around a vertical axis of the vehicle body.

The engine control unit 110, the transmission control unit 120, and the driving force distribution control unit 130 may include, for example, a microcomputer including, without limitation, a data processor such as a CPU (central processing unit), a storage such as a RAM (random access memory) and a ROM (read only memory), input and output interfaces, and a bus that couples them together.

The engine control unit 110, the transmission control unit 120, and the driving force distribution control unit 130 may be communicably coupled directly or through an in-vehicle LAN (local area network) such as a CAN (controller area network) communication system.

The transfer clutch driving unit 140 is a device configured to control the fastening force of the transfer clutch 40.

For example, when the transfer clutch 40 is of the hydraulic type, the transfer clutch driving unit 140 is configured to adjust hydraulic pressure as a source of the fastening force in the transfer clutch 40.

The transfer clutch driving unit 140 may include a pressure regulation valve configured to regulate hydraulic pressure supplied from an unillustrated oil pump provided in the transmission 20 and supply the resultant hydraulic pressure to the transfer clutch 40.

The transfer clutch driving unit 140 is configured to control the hydraulic pressure of the transfer clutch 40 in accordance with an instruction value from the driving force distribution control unit 130, to control the restraining force of the transfer clutch 40, i.e., transmission torque.

The display device 150 is an image display device configured to provide the occupant with display of, for example, the estimated driving forces of the front wheel FW and the rear wheel RW calculated by the driving force distribution control unit 130.

The display device 150 may include, for example, an LCD (liquid crystal display) or an organic EL (electroluminescence) display provided on an instrument panel, or a head-up display (HUD), without limitation. The head-up display is configured to project images onto a windshield provided in front of the occupant.

Contents of the display on the display device 150 are described in detail later.

In the vehicle 1 of the embodiment, the front wheels FW directly coupled to the output shaft of the transmission 20 may serve as main driving wheels, and the rear wheels RW to which the driving force corresponding to the restraining force of the transfer clutch 40 is transmitted may serve as sub-driving wheels.

In the embodiment, the driving force distribution control unit 130 is configured to estimate the driving forces of the front wheels FW and the rear wheels RW during the travel of the vehicle inclusive of cornering.

The driving force of the front wheels FW and the driving force of the rear wheels RW when the transfer clutch 40 is locked, i.e., when there is no differential rotation between the front wheel driving force transmission mechanism 30 and the rear wheel driving force transmission mechanism 50, are each determined by a difference in a tire slip rate when the front wheels FW and the rear wheels RW have the same rotation speeds, and braking and driving force characteristics, i.e., a driving stiffness and a braking stiffness.

A front shaft driving force and a rear shaft driving force are expressed by the following Expressions 1 and 2. The front shaft driving force is a sum of the driving forces of the right and left front wheels FW. The rear shaft driving force is a sum of the driving forces of the right and left rear wheels RW.

Let us assume the following.
Kxf: braking stiffness of the front wheels
Kxr: braking stiffness of the rear wheels
λf: slip rate of the front wheels
λr: slip rate of the rear wheels Front shaft driving force=Kxf×λf (signed)
=(transmission output torque×final reduction ratio/tire dynamic load radius (an average of the front and rear wheels))

×Kxf/(Kxf+Kxr) +Kxf×λf(signed)±error correction at
  slip rate of 0          (Expression 1)

Rear shaft driving force=Kxr×λr (signed)
=(transmission output torque×final reduction ratio/tire dynamic load radius (an average of the front and rear wheels))

×Kxr/(Kxf+Kxr) +Kxr×λr(signed)±error correction at
  slip rate of 0          (Expression 2)

In the calculation of the driving force, unless the vehicle speed at the slip rate λ of 0 is accurately obtained, the driving force is offset. Thus, as in the second row and subsequent rows of each expression, the driving force is calculated by a plus or minus offset from a total driving force. The total driving force is an average value of the driving forces of the front and rear wheels.

Moreover, when the vehicle is cornering, the driving stiffnesses, or the braking stiffnesses, Kxf and Kxr are corrected in accordance with tire slip angles of the front wheels FW and the rear wheels RW. Description of this is given in detail later.

Moreover, let us assume TRFΔVω to be a comparison value between front and rear differential rotation and a difference in a wheel speed to be assumed on the occasion of free rolling in which the braking or driving force is zero. The front and rear differential rotation is calculated from output values of the vehicle speed sensors 131 and 132. In this case, the value TRFΔVω is expressed by the following Expression 3.

TRFΔVω=(difference in a peripheral speed between the front and rear shafts (actual value)—difference in the free rolling speed (estimated value)/difference in the peripheral speed between the front and rear shafts (actual value)) (Expression 3)

Estimating, from the value TRFΔVω, a slip of the front wheels FW as the main driving wheels greater than a case where the front and rear wheels roll freely, i.e., a slip of the transfer clutch 40, and making a correction to reduce torque for braking of the rear wheels RW as the sub-driving wheels make it possible to continuously estimate the driving forces without switching the calculation expression.

In the following, an example of a method of estimating the driving force is described in detail.

A definition of the tire slip rate λ is described below.

Figure 2B:
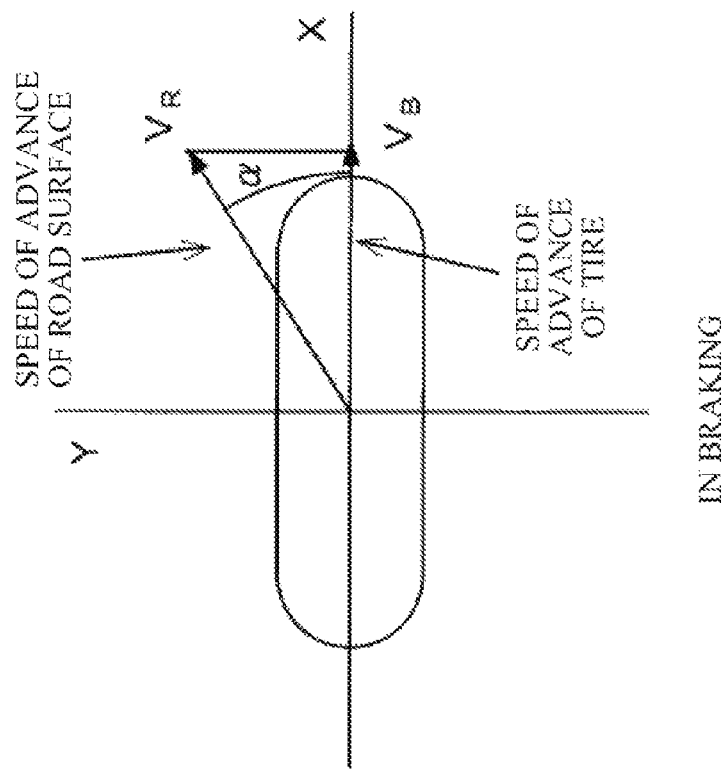
FIGS. 2A and 2B are diagrams illustrating relation between a speed of a tire, a speed of a road surface, and a slip angle.
Figure 2A:
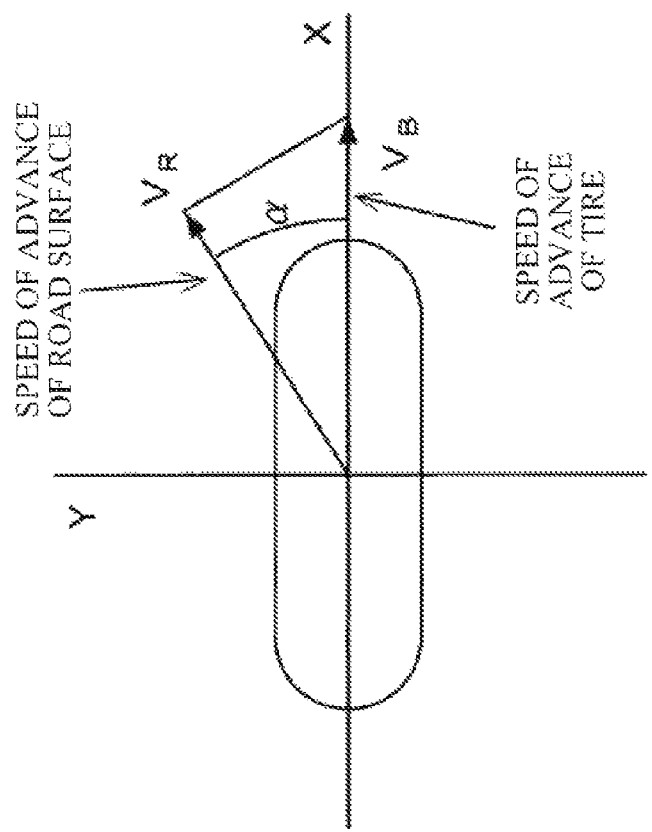

The slip rate λ is expressed by the following Expression 4.

$$\lambda = \begin{cases} \dfrac{V_R \cos\alpha - V_B}{V_R \cos\alpha} \geq 0 & \text{(in braking)} \\ \dfrac{V_R \cos\alpha - V_B}{V_B} < 0 & \text{(in driving)} \end{cases} \quad \text{(Expression 4)}$$

λ: slip rate
VR: speed of a road surface
VB: average speed of a tire in a ground plane of a tread base
α: tire slip angle FIGS. 2A and 2B illustrate relation between a speed of a tire, a speed of a road surface, and a slip angle.

FIG. 2A illustrates a state in driving, and FIG. 2B illustrates a state in braking.

The average speed VB in the ground plane of the tread base is expressed by the following Expression 5.

$$VB = r \cdot \omega \quad \text{(Expression 5)}$$

r: rolling radius of the tire
ω: rotation angular velocity

The braking or driving force of the tire is expressed by the following Expression 6.

$$F = Kx \cdot \lambda \quad \text{(Expression 6)}$$

Figure 3:
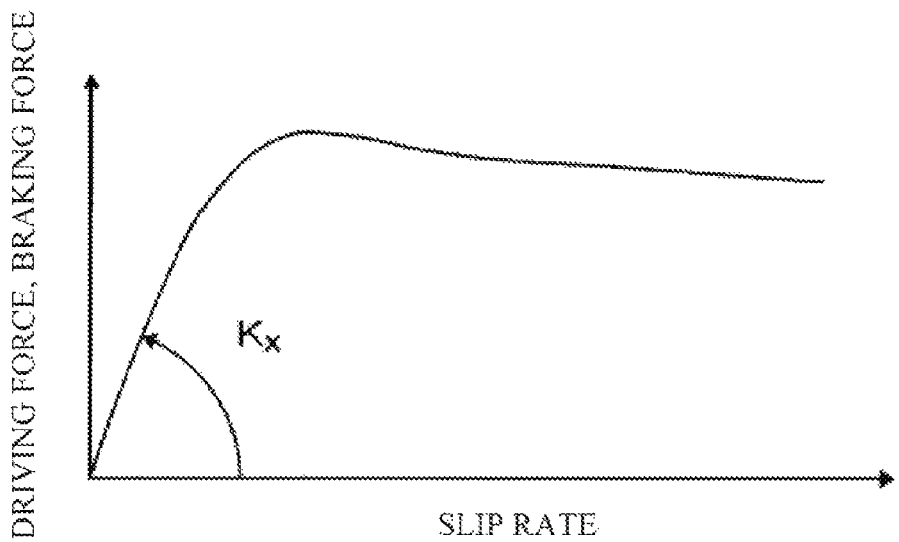
FIG. 3 is a diagram illustrating an example of correlation between a tire slip rate and a braking or driving force.

F: braking force or driving force of the tire
Kx: braking stiffness or driving stiffness of the tire
λ: slip rate FIG. 3 illustrates an example of correlation between the tire slip rate and the braking or driving force.

In FIG. 3, the horizontal axis represents the slip rate, and the vertical axis represents the braking force or the driving force.

In FIG. 3, in a region where the slip rate is relatively small, the braking or driving force increases substantially in proportion to the slip rate. An inclination in such a region makes the braking stiffness Kx.

A grounding width w and a grounding length l of the tire are expressed by the following Expressions 7 and 8.

$$w = w_0 \left(\dfrac{Fz}{Fz_0}\right)^{1/4} \quad \text{(Expression 7)}$$

$$l = \dfrac{l_0 \left(\dfrac{Fz}{Fz_0}\right)^{1/2}}{2} \quad \text{(Expression 8)}$$

w: grounding width
w0: grounding width when the vertical load is Fz0
l: grounding length
l0: grounding length when the vertical load is Fz0
Fz: vertical load When considering a model of a tire structure, the braking stiffness is proportional to a product of the square of the grounding length and the grounding width. The braking stiffness almost matches the driving stiffness. Thus, the braking stiffness is proportional to the 11/4 power of the vertical load. There is nothing wrong with handling the 11/4 power as the first power.

Figure 4:
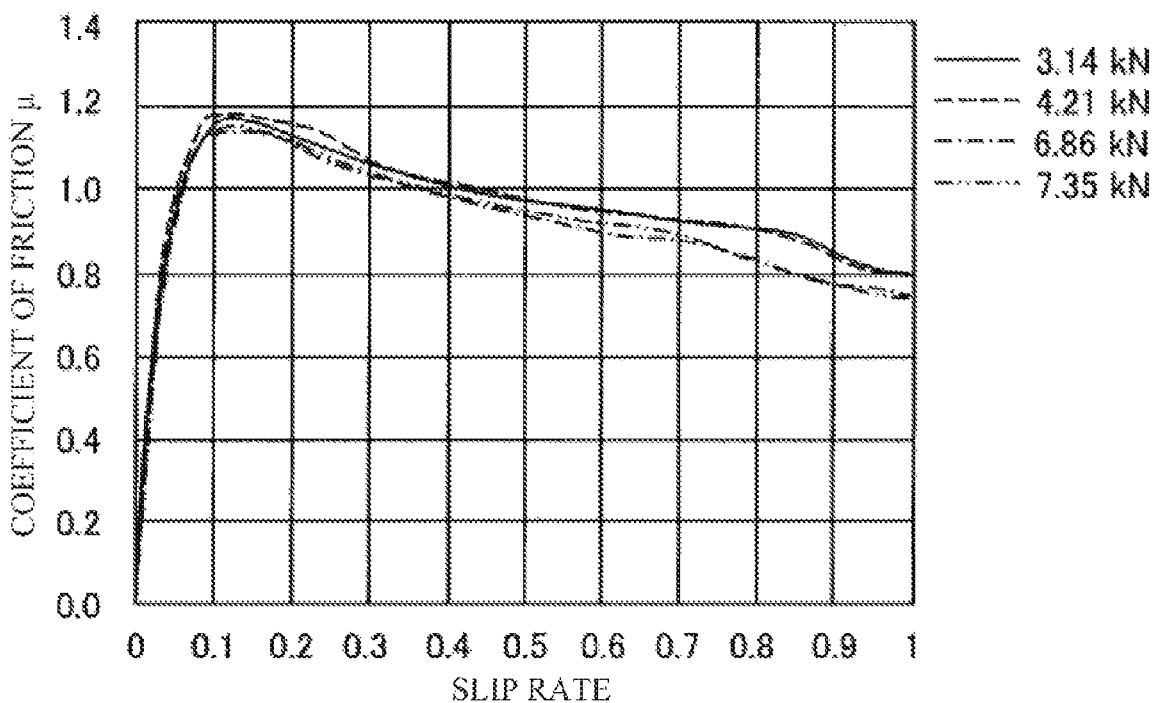
FIG. 4 is a diagram illustrating a general μ-s characteristic obtained by dividing the braking or driving force by a vertical load.

FIG. 4 illustrates a general μ-s characteristic obtained by dividing the braking or driving force by the vertical load.

The horizontal axis represents the slip rate, and the vertical axis represents the coefficient of friction.

As illustrated, it can be seen that the braking stiffness or the driving stiffness is substantially constant regardless of changes in the vertical load.

Figure 5:
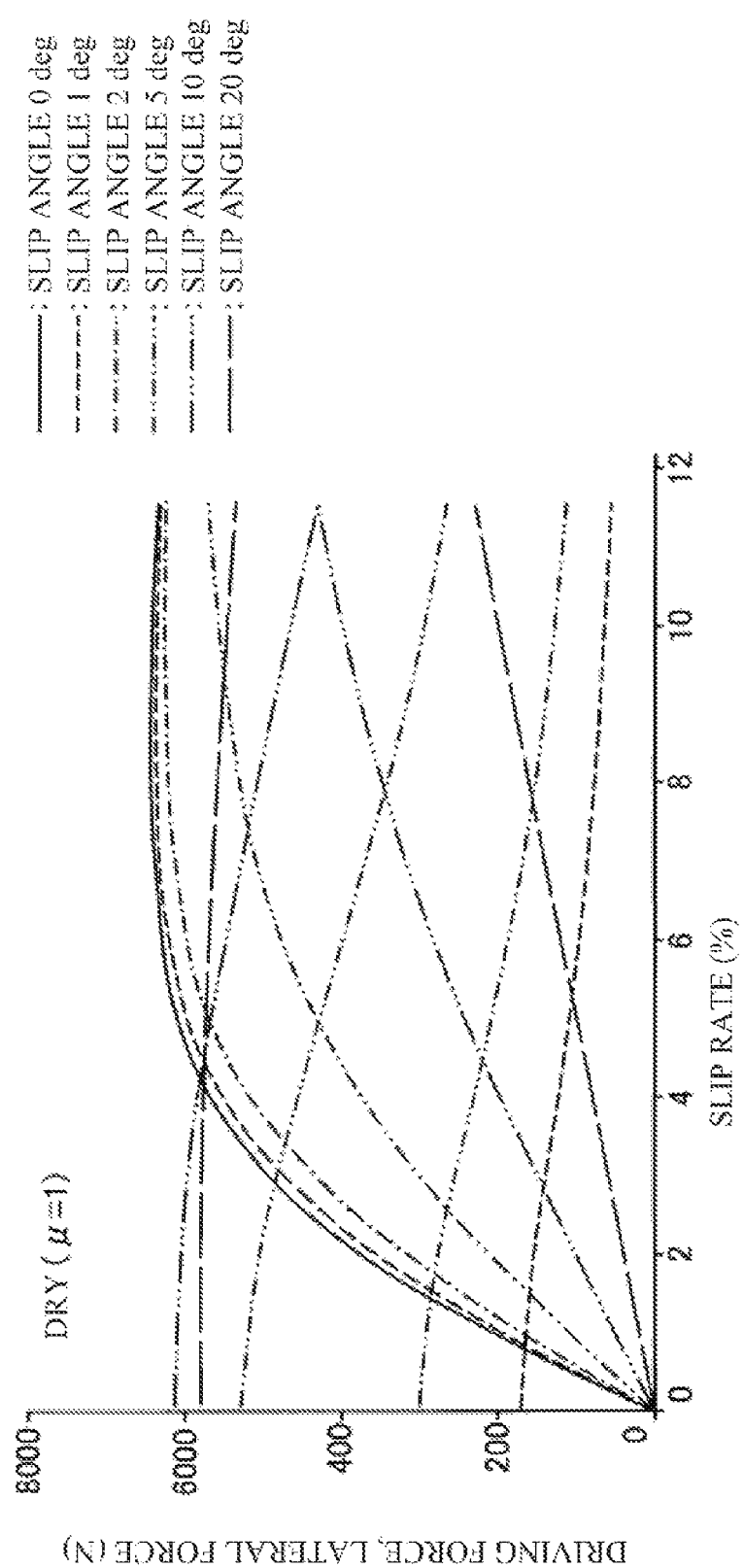
FIG. 5 is a diagram illustrating an example of trial calculation of a braking stiffness or a driving stiffness on the occasion of cornering with a tire model, in which a road surface μ equals to 1 (μ=1).
Figure 6:
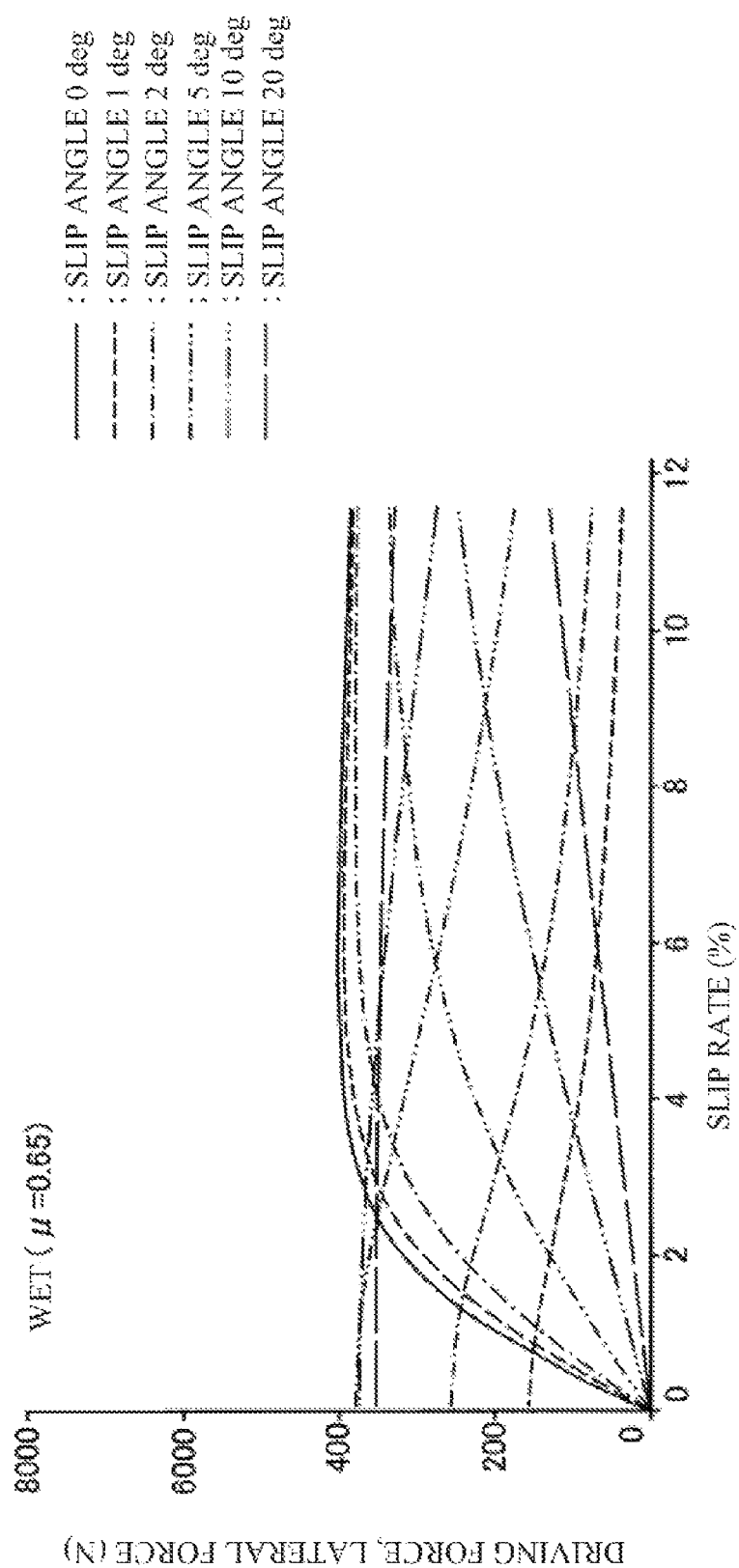
FIG. 6 is a diagram illustrating an example of the trial calculation of the braking stiffness or the driving stiffness on the occasion of cornering with the tire model, in which the road surface μ equals to 0.65 (μ=0.65).

FIGS. 5 and 6 illustrate examples in which the braking stiffness or the driving stiffness on the occasion of cornering is estimated with the tire model.

FIG. 5 illustrates an example where the road surface μ equals to 1.0 (μ=1.0) that corresponds to a dry paved road surface. FIG. 6 illustrates an example where the road surface μ equals to 0.65 (μ=0.65) that corresponds to a wet paved road surface.

As can be seen from these figures, the braking stiffness or the driving stiffness Kx when the tire slip angle α equals to 0 (α=0), i.e., a gradient of the braking and driving force with respect to the slip rate when the slip rate λ equals to 0 (λ=0), is determined by characteristics of the tire structure, and therefore, does not depend on the road surface but decreases with an increase in the tire slip angle α as the vehicle is cornering.

It is possible to calculate the tire slip angle α from a vehicle body slip angle β estimated with a vehicle model.

The total driving force FxEG of the vehicle is expressed by the following Expression 9.

Total driving force FxEG=

(engine output torque−drag torque−transmission
hydraulic pump loss)×torque converter torque
ratio×transmission shifting ratio   (Expression 9)

It is possible to estimate the engine output torque from an operation state of the engine 10.

The drag torque, i.e., friction torque, is a constant.

It is possible to acquire the transmission hydraulic pump loss, the torque converter torque ratio, and the transmission shifting ratio from the transmission control unit 120.

Peripheral speeds Vwf and Vwr of the front wheels FW and the rear wheels RW are expressed by the following Expression 10.

Vwf, Vwr= average wheel speed of the right and left wheels×tire
diameter of the front or rear wheels (actual
value)/tire diameter of the front or rear wheels
(set value)   (Expression 10)

Here, the set value of the tire diameter refers to a tire diameter to be used in calculating the vehicle speed based on the outputs of the vehicle speed sensors 131 and 132.

Values Vtf and Vtr obtained by converting rotation speeds of the front and rear shafts of the transfer clutch 40 into peripheral speeds of the tires are expressed by the following Expression 11.

Vtf, Vtr= average wheel speed of the right and left wheels×
average of wheel diameters (actual values) of
the front and rear wheels/tire diameter of the
front or rear wheels (set value)   (Expression 11)

The vehicle speed V, i.e., a ground speed of the vehicle body of the vehicle 1, is an average of the wheel speeds of the four wheels detected by the vehicle speed sensors.

Figure 7:
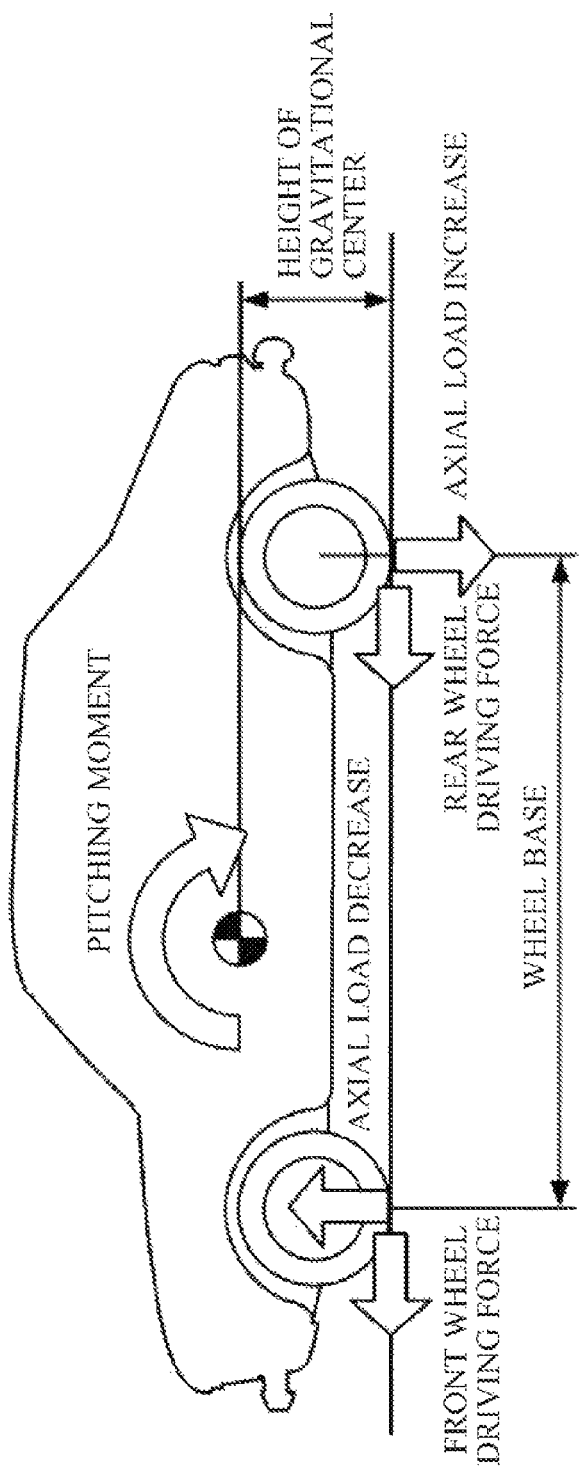
FIG. 7 is a diagram schematically illustrating a state in which a vehicle exhibits pitching behavior in a nose-up direction by acceleration.

FIG. 7 schematically illustrates a state in which a vehicle exhibits pitching behavior in a nose-up direction by acceleration.

On the occasion of acceleration, a pitching moment in the nose-up direction acts around the center of gravity CG, while an axial load of the front wheels FW decreases and an axial load of the rear wheels RW increases.

The longitudinal load shift ΔFz caused by acceleration or deceleration is expressed by the following expression.

ΔFz=vehicle mass×longitudinal acceleration rate×
height of the gravitational center/wheel base (Expression 12)

The vehicle mass, the height of the gravitational center, and the wheel base are constants unique to the vehicle.

It is possible to detect the longitudinal acceleration rate with the use of a longitudinal acceleration rate sensor.

The vertical loads Fzf and Fzr of the front and rear wheels are obtained by adding or subtracting the longitudinal load shift ΔFz mentioned above to or from a reference load, i.e., a vertical load at rest, and are expressed by the following expressions.

Fzf=Fzf0−ΔFzf (Expression 13)

Fzr=Fzr0+ΔFzr (Expression 14)

Figure 8:
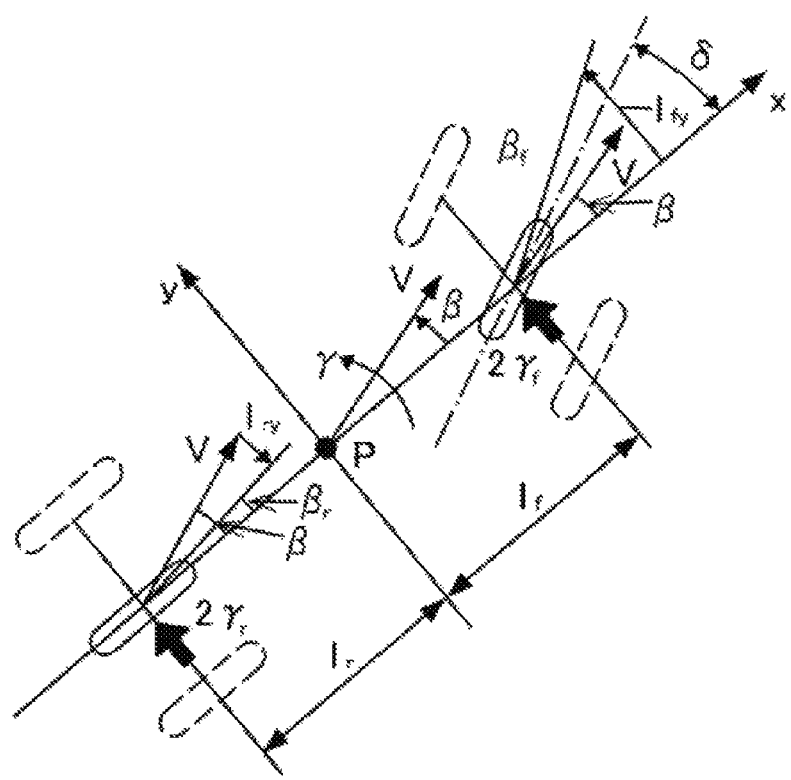
FIG. 8 is a diagram illustrating an example of an equivalent two-wheel model of a four-wheel automobile.

Fzf: vertical load of the front wheels
Fzr: vertical load of the rear wheels
Fzf0: vertical load of the fronts wheel at rest
Fzr0: vertical load of the rear wheels at rest
ΔFzx: amount of load shift caused by acceleration The amount of load shift ΔFzx caused by acceleration is expressed by the following Expression 15.

$$\Delta F_{zx} = \frac{m \cdot \ddot{x} \cdot h_g}{2 \cdot l}$$ (Expression 15)

m: vehicle mass
ẍ: longitudinal acceleration rate
hg: height of the gravitational center
l: wheel base FIG. 8 illustrates an example of an equivalent two-wheel model of a four-wheel automobile.

The vehicle body slip angle β is expressed by the following Expression 16.
Vehicle body slip angle β=

(1−(vehicle mass m/(2×wheel base l))×(distance lf
between the front shaft and the center of gravity /(distance lr between the rear shaft and the center of gravity×cornering power Kr of the rear wheels))×(vehicle speed V2))) /(1+stability factor A×vehicle speed V2)×(distance lr between the rear shaft and the center of gravity/ wheel base l)×(steering wheel angle θH steering gear ratio n) (Expression 16)

The vehicle mass m, the distance lf between the front shaft and the center of gravity, the distance lr between the rear shaft and the center of gravity, the cornering power Kr of the rear wheels, the stability factor A, the wheel base 1, and the steering gear ratio n are constants unique to the vehicle.

It is possible to acquire the vehicle speed V from the vehicle speed sensors, and the steering wheel angle θH from the steering angle sensor 133.

The vehicle body slip angle β is expressed by the following Expression 17.

$$\beta = \left( \frac{1 - \frac{m}{2 \cdot l\, l_r \cdot K_r} V^2}{1 - \frac{m}{2 \cdot l^2} \frac{l_f \cdot K_f - l_r \cdot K_r}{K_f \cdot K_r} V^2} \right) \frac{l_r}{l} \delta$$

$$= \frac{1 - \frac{m}{2 \cdot l\, l_r \cdot K_r} V^2}{1 + A \cdot V^2} \frac{l_r}{l} \delta$$ (Expression 17)

The ground speeds Vf and Vr of the front and rear shafts, i.e., the center positions of the right and left wheels, are expressed by the following Expressions 18 and 19.

The ground speeds Vf and Vr are obtained by adding or subtracting, to or from the vehicle speed V, a product of the distance lf or lr between the front or rear shaft and the center of gravity, the vehicle body slip angle β, and the yaw rate γ.

$$\begin{cases} V_f = V \cdot \frac{\rho + l_f \cdot \beta}{\rho} = V \cdot \frac{\left(\frac{V}{\gamma} + l_f \cdot \beta\right)}{\frac{V}{\gamma}} = \\ \quad V \cdot \left(1 + \frac{l_f \cdot \beta \cdot \gamma}{V}\right) = V + l_f \cdot \beta \cdot \gamma \\ V_r = V \cdot \frac{\rho - l_r \cdot \beta}{\rho} = V \cdot \frac{\left(\frac{V}{\gamma} - l_r \cdot \beta\right)}{\frac{V}{\gamma}} = \\ \quad V \cdot \left(1 - \frac{l_r \cdot \beta \cdot \gamma}{V}\right) = V - l_r \cdot \beta \cdot \gamma \end{cases}$$ (Expressions 18 and 19)

Vf: road surface speed of a grounding point of a front wheel tire [m/s]
Vr: road surface speed of a grounding point of a rear wheel tire [m/s]
ρ: radius of cornering of a point of the center of gravity [m]
γ: yaw rate [rad/s]

The slip angles αf and αr of the front and rear wheels are expressed by the following Expressions 20 and 21.

αf=steering wheel angle θH/steering gear ratio
 n−vehicle body slip angle β−distance lf
 between the front shaft and the center of gravity×yaw rate γ/vehicle speed V (Expression 20)

αr=−vehicle body slip angle β−distance lr between
 the rear shaft and the center of gravity×yaw
 rate γ/vehicle speed V (Expression 21)

The front wheel steering angle δf is expressed by the following Expression 22.

δf=θH/n (Expression 22)

The slip angles αf and αr of the front and rear wheels are expressed by the following Expressions 23 and 24.

$$\begin{cases} \alpha_f = \delta_f - \beta - \frac{l_f \cdot \gamma}{V} \\ \alpha_r = -\beta + \frac{l_r \cdot \gamma}{V} \end{cases}$$ (Expressions 23 and 24)

αf : slip angle of the front wheels [rad]
αr: slip angle of the rear wheels [rad]
δf: front wheel steering angle [rad]
β: vehicle body slip angle [rad]

lf: distance between the front shaft and the center of gravity [m]
lr: distance between the rear shaft and the center of gravity [m]
γ: yaw rate [rad/s]
V: vehicle speed [m/s]

The free rolling speeds Vf_free and Vr_free of the front wheels FW and the rear wheels RW are expressed as follows.

$$\begin{cases} V_{f\_free} = V_f \cdot \cos(\alpha_f) \\ V_{r\_free} = V_r \cdot \cos(\alpha_r) \end{cases} \quad \text{(Expressions 25 and 26)}$$

The slip rates λ, i.e., the slip rates λf and λr, of the front wheels FW and the rear wheels RW are expressed by the following expressions.

$$\lambda = \begin{cases} \dfrac{V_R \cos\alpha - V_B}{V_R \cos\alpha} \geq 0 & \text{(in braking)} \\ \dfrac{V_R \cos\alpha - V_B}{V_B} < 0 & \text{(in driving)} \end{cases} \quad \text{(Expressions 27 and 28)}$$

λ: slip rate
VR: speed of the road surface=Vf_free, Vr_free
VB: average speed in the ground plane of the tread base The driving stiffnesses Kxf and Kxr of the front wheels FW and the rear wheels RW are expressed by the following expression. The driving stiffnesses are substantially equal to the braking stiffnesses.

Kxf, Kxr=MAX (reference value of the driving stiffness/the vertical load (when constant: α=0)×vertical load Fzf, Fzr of the front or rear wheels×cos(rBx1 (model constant)×Atan (tKxf, tKxr)), minimum value (constant)) tKxf, tKxr) =rBx1(MF constant)×cos (Atan (rBx2 (model constant)×slip rate (constant: 0.01))×slip angle αf, αr of the front or rear wheels    (Expression 29)

The model constants mentioned above are constants to be used in calculation with a numerical calculation model of a tire.

As such a numerical calculation model of a tire, for example, Magic Formula (MF) may be used.

The driving forces FxDf and FxDr of the front wheels FW and the rear wheels RW calculated from the tire slip rates are expressed by the following Expression 30.

Driving force FxDf, FxDr=driving stiffness Kxf, Kxr of the front wheels FW or the rear wheels RW×slip rate λf, λr of the front wheels FW or the rear wheels RW×100    (Expression 30)

Here, the driving stiffnesses Kxf and Kxr of the front wheels FW and the rear wheels RW vary with the tire slip angles.

Figure 9:
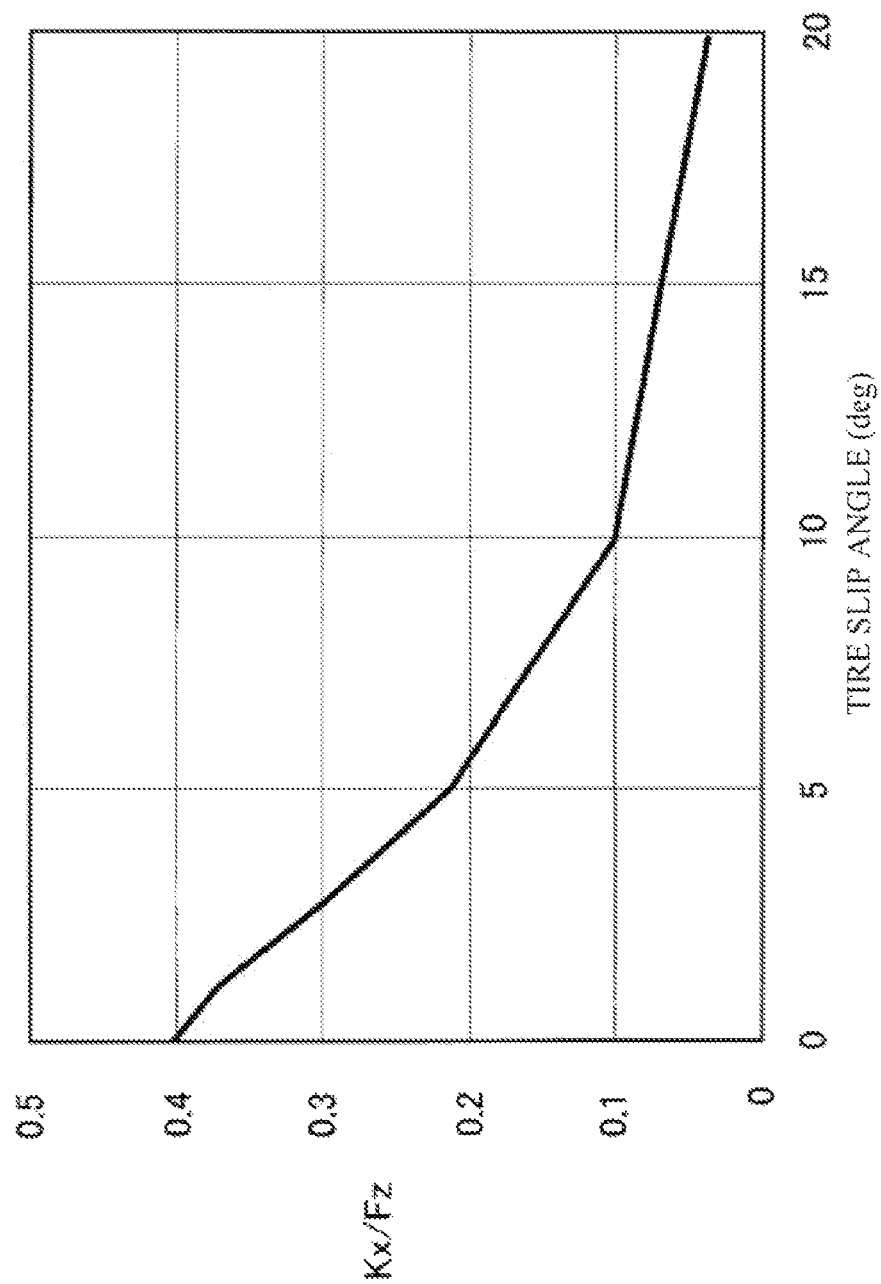
FIG. 9 is a diagram illustrating correlation between a tire slip angle and a value obtained by dividing the driving stiffness by a tire vertical load.

FIG. 9 illustrates correlation between a value obtained by dividing the driving stiffness by a tire vertical load and the tire slip angle.

The horizontal axis represents the tire slip angle αf or αr, and the vertical axis represents the value obtained by dividing the driving stiffness Kxf or Kxr by the vertical load Fz.

As illustrated in FIG. 9, when the vertical load Fz is equivalent, i.e., when the denominator of the vertical axis is constant, the driving stiffnesses Kxf and Kxr decrease as the tire slip angles αf and αr increase.

Thus, in calculating the driving forces, it is necessary to use the driving stiffnesses Kxf and Kxr corresponding to the tire slip angles αf and αr calculated from the vehicle model.

The front and rear shaft driving forces FxLf and FxLr assuming that the transfer clutch 40 is locked are expressed by the following Expression 31.

FxLf, FxLr=(total driving force distributed between the front and rear shafts by the ratio of the driving stiffnesses+the front or rear shaft driving force) ((total driving force FxEG×final reduction ratio/tire diameter (actual value) of the front or rear wheels)−(front shaft driving force FxDf+rear shaft driving force FxDr)×driving stiffness Kxf, Kxr of the front or rear wheels/(driving stiffness Kxf of the front wheels+driving stiffness Kxr of the rear wheels)+front or rear shaft driving force FxDf, FxDr    (Expression 31)

The lock/slip rate TRFΔVω of the transfer clutch 40 is expressed by the following Expression 32.

TRFΔVω=MIN (MAX (((front shaft rotation speed Vtf−rear shaft rotation speed Vtr)−(front wheel free rolling speed Vf_free−rear wheel free rolling speed Vr_free)) /MAX (ABS (front shaft rotation speed Vtf−rear shaft rotation speed, lower limit (zero-division prevention constant)), lower limit: −1), upper limit: 1)    (Expression 32)

Figure 10:
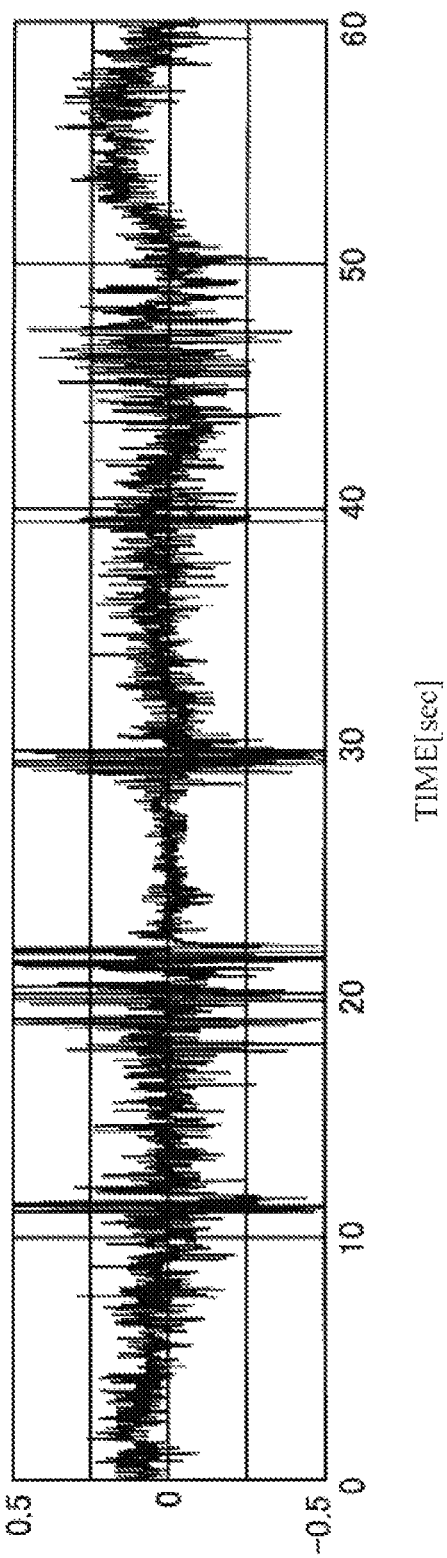
FIG. 10 is a diagram illustrating an example of a measurement result of a difference in an actual rotation speed between front and rear shafts of a transfer clutch.

FIG. 10 illustrates an example of a measurement result of a difference in an actual rotation speed between the front and rear shafts of the transfer clutch.

The horizontal axis represents time, and the vertical axis represents a difference in the rotation speed between the front shaft and the rear shaft of the transfer clutch 40, i.e., between the side on which the front wheel driving force transmission mechanism 30 is disposed, and the side on which the rear wheel driving force transmission mechanism 50 is disposed. This value indicates a difference in an actual rotation speed between the front wheels and the rear wheels.

As illustrated, in an actual vehicle, significant vibrations are observed in the differential rotation between the front and rear shafts of the transfer clutch 40.

In the expression described above, the denominator of the division is set to the difference in the actual rotation speed between the wheels having the same vibrations as the numerator. Hence, it is possible to suppress an amplitude of a calculated value of the lock/slip rate TRFΔVω of the transfer clutch 40 even when there are significant vibrations of the differential rotation between the front shaft and the rear shaft.

When the transfer clutch 40 is in the locked state, the lock/slip rate TRFΔVω exhibits vibrations of 0 to ±1 on average.

Here, the lock/slip rate TRFΔVω being a positive value indicates that the difference in the peripheral speed between the front and rear shafts is larger than the difference in the free rolling speed, and indicates that the driving force distribution is front-shaft emphasized, i.e., in a tendency close to a front wheel drive (FWD) vehicle.

The lock/slip rate TRFΔVω being a negative value indicates that the difference in the peripheral speed between the front and rear shafts is smaller than the difference in the free rolling speed, and indicates that the driving force distribution is rear-shaft emphasized, i.e., in a tendency close to a rear wheel drive (RWD) vehicle.

It is to be noted that the lock/slip rate TRFΔVω also exhibits the vibrations of 0 to ±1 on average when the transfer clutch 40 is released and the total driving force equals to 0 (=0). However, in accordance with an increase in the total driving force, the lock/slip rate TRFΔVω has vibration values with an average being offset in a positive direction when the front wheels are the main driving wheels, and in a negative direction when the rear wheels are the main driving wheels.

Transfer torque, i.e., a driving force conversion value, Ftrf is a value to subtract a transmission force of the transfer clutch 40, i.e., the driving force, from the braking force of the rear shaft in accordance with a degree of positivity of the lock/slip rate TRFΔVω described above.

When the slip rate λf of the front wheels is larger than the slip rate λr of the rear wheels (λf>λr), the transfer torque Ftrf is expressed by the following Expression 33.

Ftrf=−lock/slip rate TRFΔVω of the transfer clutch
  40×rear shaft driving force FxLr assuming that
  transfer clutch 40 is locked (Expression 33)

Otherwise, the transfer torque Ftrf equals to 0 (Ftrf=0).

The front shaft driving force FxDf considering the locked state or the slip state of the transfer clutch 40 is a value obtained by subtracting the transfer torque, i.e., the driving force conversion value, Ftrf from the front shaft driving force FxLf assuming that the transfer clutch 40 is locked.

The rear shaft driving force FxDr considering the locked state or the slip state of the transfer clutch 40 is a value obtained by adding the transfer torque, i.e., the driving force conversion value, Ftrf to the rear shaft driving force FxLr assuming that the transfer clutch 40 is locked.

Figure 11:
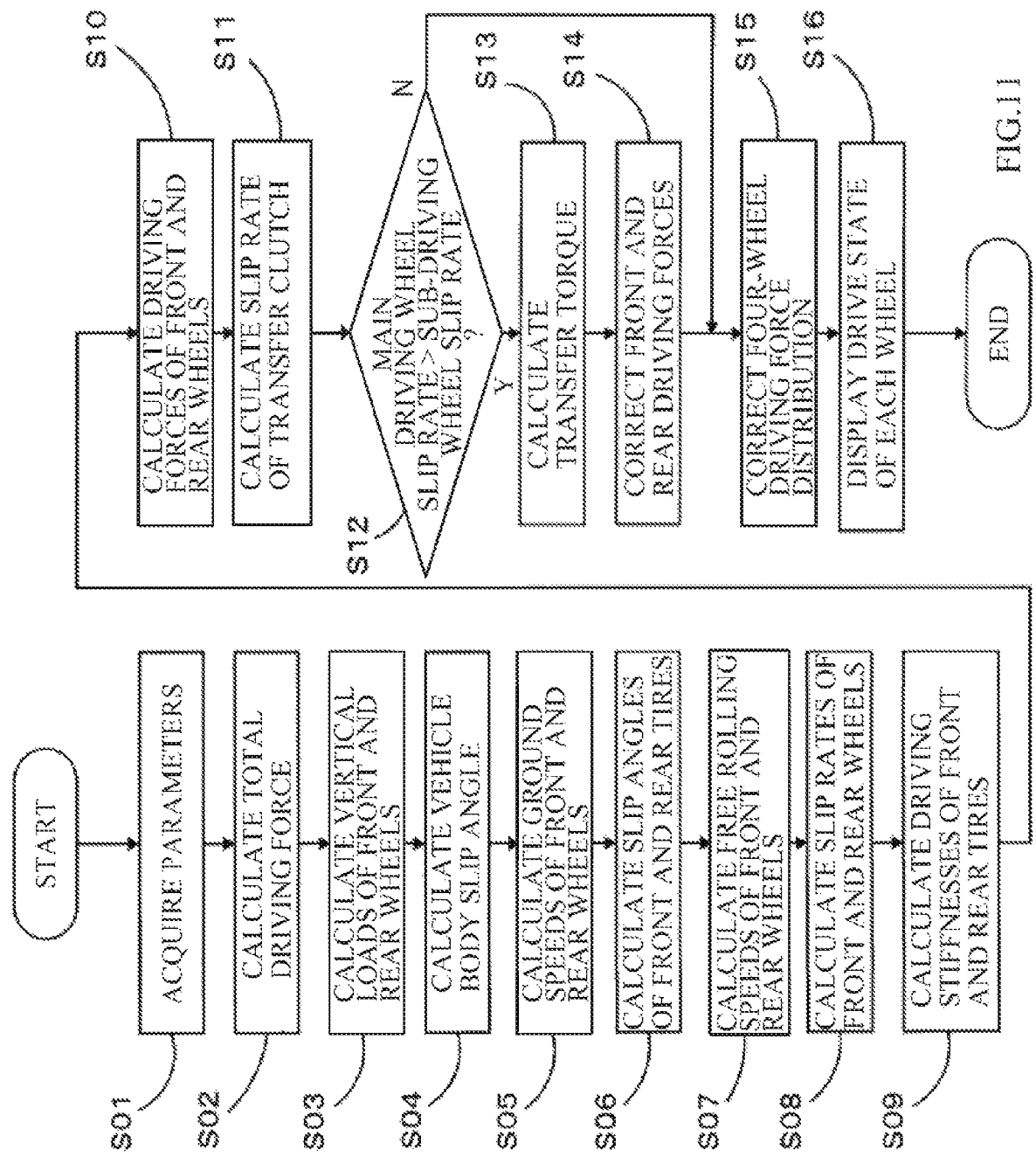
FIG. 11 is a flowchart of driving force estimation processing in the embodiment.

FIG. 11 is a flowchart illustrating driving force estimation processing in the embodiment.

In the following, description is given in the order of steps.

<Step S01: Acquire Parameters>

The driving force distribution control unit 130 may acquire, by communication, values other than the constants out of the parameters to be involved in the driving force estimation described above, from each sensor or from other units.

Thereafter, the flow may be allowed to proceed to step S02.

Step S02: Calculate Total Driving Force

The driving force distribution control unit 130 may calculate the total driving force FxEG of the front wheels FW and the rear wheels RW with the use of Expression 9 described above.

Thereafter, the flow may be allowed to proceed to step S03.

Step S03: Calculate Vertical Loads of Front and Rear Wheels

The driving force distribution control unit 130 may calculate the vertical loads Fzf and Fzr of the front wheels FW and the rear wheels RW with the use of Expressions 13 to 15 described above.

Thereafter, the flow may be allowed to proceed to step S04.

Step S04: Calculate Vehicle Body Slip Angle

The driving force distribution control unit 130 may calculate the vehicle body slip angle with the use of Expressions 16 and 17 described above.

Thereafter, the flow may be allowed to proceed to step S05.

Step S05: Calculate Ground Speeds of Front and Rear Wheels

The driving force distribution control unit 130 may calculate the ground speeds Vf and Vr of the front wheels FW and the rear wheels RW with the use of Expressions 18 and 19 described above.

Thereafter, the flow may be allowed to proceed to step S06.

Step S06: Calculate Slip Angles of Front and Rear Tires

The driving force distribution control unit 130 may calculate the slip angles αf and αr of the front wheels FW and the rear wheels RW on the occasion of cornering, etc., with the use of Expressions 23 and 24 described above.

Thereafter, the flow may be allowed to proceed to step S07.

Step S07: Calculate Free Rolling Speeds of Front and Rear Wheels

The driving force distribution control unit 130 may calculate the free rolling speeds Vf_free and Vr_free of the front wheels FW and the rear wheels RW with the use of Expressions 25 and 26 described above.

Thereafter, the flow may be allowed to proceed to step S08.

Step S08: Calculate Slip Rates of Front and Rear Wheels

The driving force distribution control unit 130 may calculate the slip rates λ, i.e., the slip rates λf and λr, of the front wheels FW and the rear wheels RW with the use of Expressions 27 and 28 described above.

Thereafter, the flow may be allowed to proceed to step S09.

Step S09: Calculate Driving Stiffnesses of Front and Rear Tires

The driving force distribution control unit 130 may calculate the driving stiffnesses Kxf and Kxr of the front wheels FW and the rear wheels RW with the use of Expression 29 described above.

Thereafter, the flow may be allowed to proceed to step S10.

Step S10: Calculate Driving Forces of Front and Rear Wheels

The driving force distribution control unit 130 may calculate the driving forces FxDf and FxDr of the front wheels FW and the rear wheels RW assuming that the transfer clutch 40 is in the locked state, with the use of Expression 30 described above.

At this occasion, as the driving stiffnesses Kxf and Kxr to be used in the calculation, the corrected values in accordance with the slip angles αf and αr of the front wheels FW and the rear wheels RW obtained in step S06 are used.

Thereafter, the flow may be allowed to proceed to step S11.

Step S11: Calculate Slip Rate of Transfer Clutch

The driving force distribution control unit 130 may calculate the lock/slip rate TRFΔVω of the transfer clutch 40 with the use of Expression 32 described above.

Thereafter, the flow may be allowed to proceed to step S12.

Step S12: Compare Slip Rates of Main Driving Wheels and Sub-Driving Wheels

The driving force distribution control unit 130 may compare the slip rate λf of the front wheels FW as the main driving wheels, with the slip rate λr of the rear wheels RW as the sub-driving wheels. When the former is larger than the latter, the driving force distribution control unit 130 may assume that the transfer clutch 40 is in the slip state, and cause the flow to proceed to step S13. Otherwise, the driving force distribution control unit 130 may assume that the transfer clutch 40 is in the locked state, and cause the flow to proceed to step S15.

Step S13: Calculate Transfer Torque

The driving force distribution control unit 130 may calculate the transfer torque Ftrf with the use of Expression 33 described above.

Thereafter, the flow may be allowed to proceed to step S14.

Step S14: Correct and Calculate Front and Rear Driving Forces

The driving force distribution control unit 130 may subtract the transfer torque, i.e., the driving force conversion value, Ftrf obtained in step S13 from the driving force FxDf of the front wheels FW obtained in step S10.

Moreover, the driving force distribution control unit 130 may add the transfer torque Ftrf obtained in step S13 to the driving force FxDr of the rear wheels RW obtained in step S10.

Thereafter, the flow may be allowed to proceed to step S15.

Step S15: Correct Four-Wheel Diving Force Distribution

The driving force distribution control unit 130 may compare an actual front-rear driving force distribution ratio with a target front-rear driving force distribution ratio to be used in the control of the transfer clutch 40. The actual front-rear driving force distribution ratio is a ratio between the driving forces FxDf and FxDr of the front wheels FW and the rear wheels RW. When the correction in step S14 is made, the actual front-rear driving force distribution ratio is the corrected value.

When the actual front-rear driving force distribution ratio deviates from the target front-rear driving force distribution ratio by a predetermined value or more, the driving force distribution control unit 130 may assume that the characteristics of the transfer clutch 40 have changed due to, for example, individual differences and/or aging changes of the transfer clutch 40, and perform learning correction to increase or decrease an instruction value to be given to the transfer clutch driving unit 140. Non-limiting examples of the characteristics of the transfer clutch 40 may include correlation of the fastening force or the transfer torque with respect to command values.

Thereafter, the flow may be allowed to proceed to step S16.

Step S16: Display Drive State of Each Wheel

The driving force distribution control unit 130 may allow the display device 150 to display the information regarding the current driving forces FxDf and FxDr of the front wheels FW and the rear wheels RW, and provide the information to the occupant, e.g., the driver.

At this occasion, the driving force distribution control unit 130 may be configured to allow the display device 150 to display the steering angle and the steering wheel angle of the vehicle 1, and a recommended direction of steering. Non-limiting examples of the display are described in detail later.

Thereafter, the series of processing may be ended.

Figure 12B:
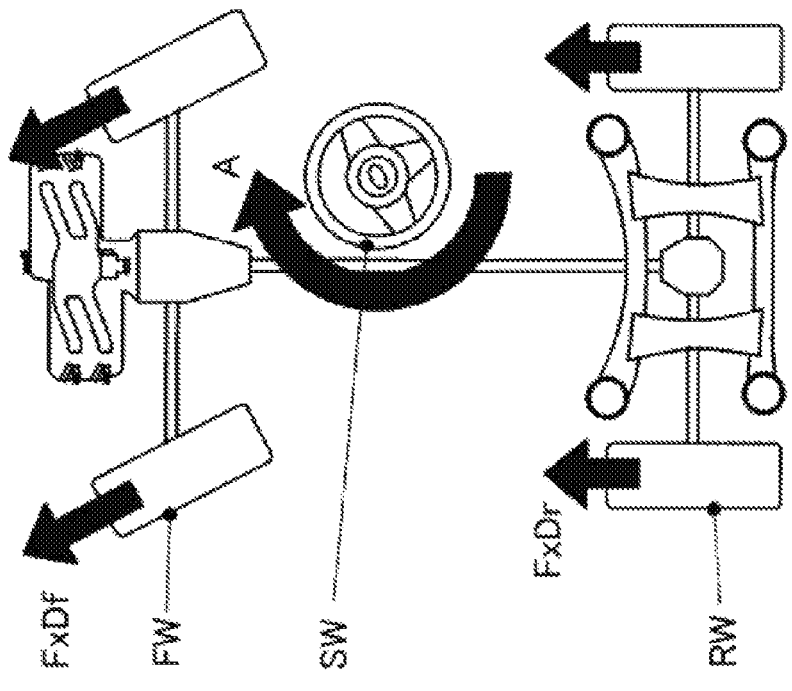
FIGS. 12A and 12B are diagrams illustrating examples of display images of drive states of each wheel on a display device.
Figure 12A:
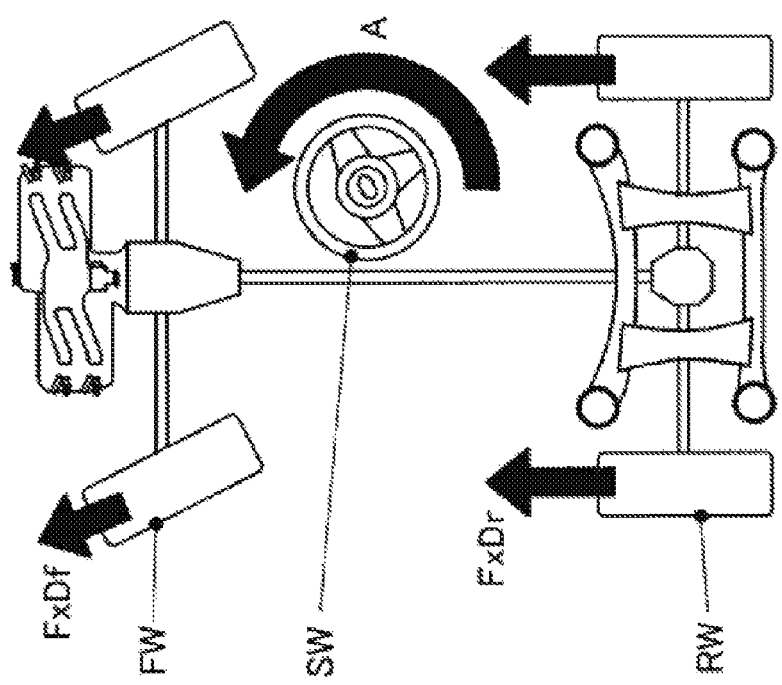

FIGS. 12A and 12B illustrate examples of display images of drive states of each wheel on the display device.

The display images may include illustration of the front wheels FW, the rear wheels RW, and the steering wheel SW.

The front wheels FW and the steering wheel SW are displayed in a rotated state on the display image in accordance with the current steering angle and the current steering wheel angle, making it possible for, for example, the driver to visually recognize the steering angle and the steering wheel angle.

Magnitude of the driving forces FxDf and FxDr and directions in which the driving forces FxDf and FxDr act are indicated by arrow-shaped marks superimposed on, or displayed adjacently to, the front wheels FW and the rear wheels RW.

FIG. 12A illustrates an image to be displayed as driver assistance when the vehicle passes through a curved road.

FIG. 12A illustrates a state when the vehicle passes through a left corner, and provides arrow-shaped indication A adjacently to the illustration of the steering wheel SW to prompt the driver to steer to the left.

It can be seen that, to enhance head turning performance on the occasion of cornering, the front-rear driving force distribution of the vehicle 1 is in a rear-wheel emphasized state in which the driving force FxDr of the rear wheels RW is relatively large with respect to the driving force FxDf of the front wheels FW.

FIG. 12B illustrates an image to be displayed as the driver assistance when the vehicle passes through a straight road.

In FIG. 12B, the driving force distribution of the vehicle 1 is in a front-wheel emphasized state in which the driving force FxDf of the front wheels FW is relatively large with respect to the driving force FxDr of the rear wheels RW.

However, in this case, the steering wheel angle and the steering angle to the left are generated, and it can be seen that the driving force FxDf of the front wheels FW acts to disturb straight travel performance of the vehicle 1.

Thus, the arrow-shaped indication A is provided adjacently to the illustration of the steering wheel SW to prompt the driver to steer to return the steering angle, e.g., to the right in this case.

As described, using the image displayed on the display device 150 makes it possible for the driver to visually and intuitively understand whether or not the driving force and the steering angle of the vehicle 1 are in an ideal state.

Figure 13:
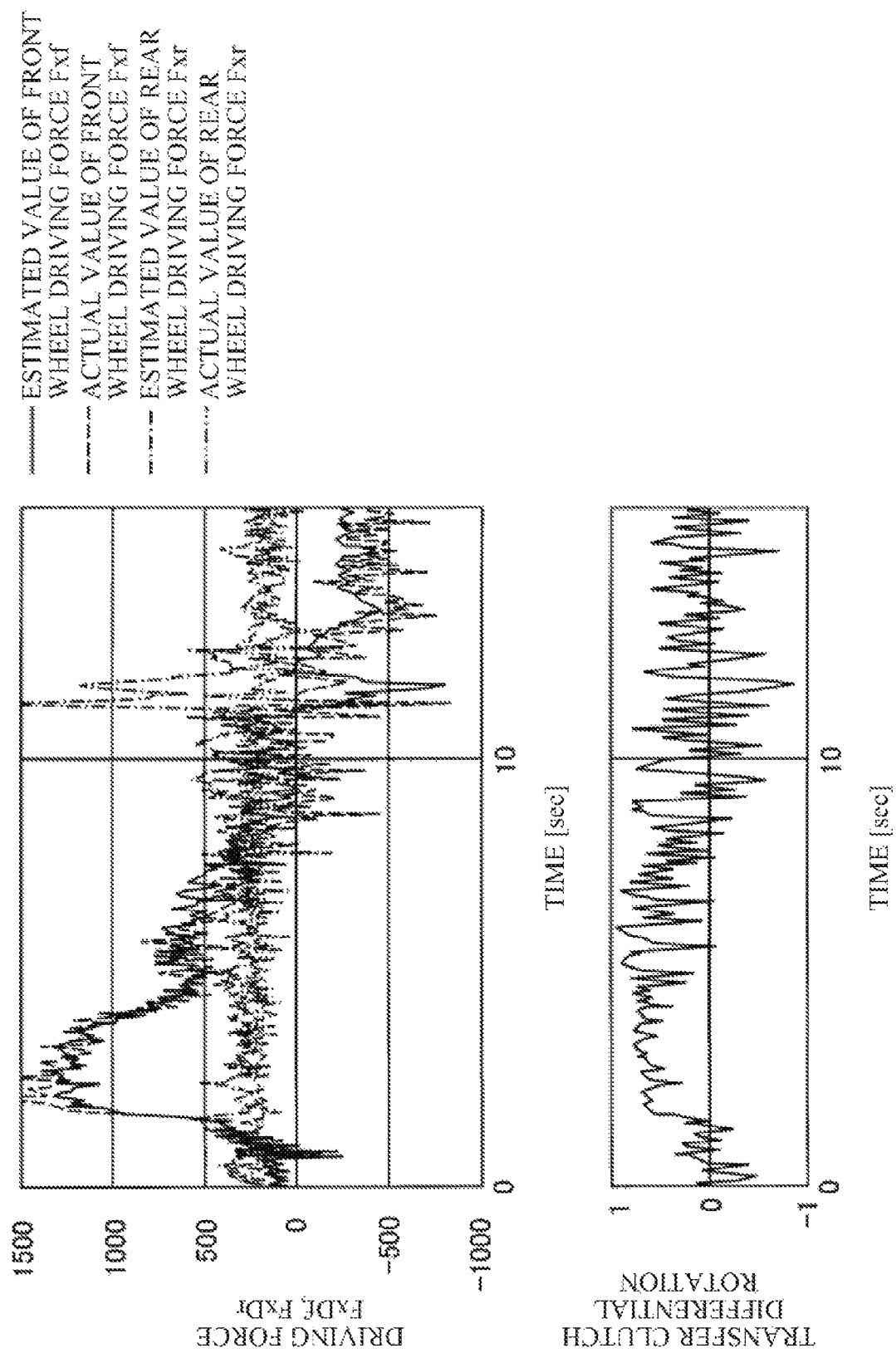
FIG. 13 is a diagram illustrating an example of an estimation result of driving forces in the driving force estimation apparatus of the embodiment.

FIG. 13 illustrates an example of an estimation result of the driving forces FxDf and FxDr in the driving force estimation apparatus according to the embodiment.

The upper part of FIG. 13 illustrates an estimated value and an actual value of the driving force FxDf of the front wheels FW, and an estimated value and an actual value of the driving force FxDr of the rear wheels RW.

The lower part of FIG. 13 illustrates the differential rotation of the transfer clutch 40.

As illustrated in FIG. 13, it can be seen that the driving force FxDf of the front wheel FW and the driving force FxDr of the rear wheel RW are appropriately estimated by the method of the embodiment.

According to the embodiment described above, it is possible to obtain the following effects.

(1) The slip rates $\lambda f$ and $\lambda r$ of the front wheels FW and the rear wheels RW are calculated based on the free rolling rotation speeds and the actual rotation speeds of the front wheels FW and the rear wheels RW. Hence, it is possible to appropriately calculate the slip rates $\lambda f$ and $\lambda r$, and appropriately estimate the driving forces FxDf and FxDr even in a four-wheel drive vehicle devoid of driven wheels to which no driving force is transmitted, which makes it difficult to acquire the vehicle speed as a reference.

Moreover, the driving stiffness or the braking stiffness Kx to be used in the estimation of the driving forces FxDf and FxDr is corrected in accordance with the slip angles $\alpha f$ and $\alpha r$ of the front wheels FW and the rear wheels RW. Hence, it is possible to appropriately estimate the driving forces even when the vehicle 1 is cornering.

(2) The transmission torque of the transfer clutch 40 is estimated, and the driving forces FxDf and FxDr are corrected in accordance with the lock/slip rate of the transfer clutch 40. Hence, it is possible to enhance estimation accuracy of the driving forces.

(3) The transmission torque is estimated based on the difference in the actual rotation speed between the front wheels FW and the rear wheels RW, and the difference in the free rolling rotation speed. Hence, it is possible to appropriately grasp the lock/slip state of the transfer clutch 40 based on the parameters that are easy to detect.

(4) The transmission torque is estimated based on the value obtained by dividing the difference between the difference in the actual rotation speed between the front wheels FW and the rear wheels RW and the difference in the free rotation speed between the front wheels FW and the rear wheels RW by the difference in the actual rotation speed between the front wheels FW and the rear wheels RW. Accordingly, even when there are significant variations in the actual measured value of the difference in the actual rotation speed between the front wheels FW and the rear wheels RW, i.e., the differential rotation of the transfer clutch 40, using the value in both the numerator and the denominator of the estimated value of the transmission torque makes it possible to prevent divergence of the estimated value of the transmission torque.

(5) When the estimated driving force distribution between the front wheels FW and the rear wheels RW deviates from the target value in the driving force distribution control, correcting the command value in the driving force distribution control makes it possible to bring the driving force distribution close to an ideal state.

(6) The occupant is provided with the information regarding the estimated driving forces. Hence, it is possible to prompt the occupant to make an appropriate driving operation and provide assistance in more stabilized travel of the vehicle.

As described, according to the disclosure, it is possible to provide a driving force estimation apparatus that makes it possible to appropriately estimate a drive state.

Modification Examples

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

(1) The configurations of the driving force estimation apparatus and the vehicle are not limited to the forgoing embodiments but may be altered as appropriate.

For example, in the embodiment, the vehicle 1 includes the front wheels as the main driving wheels directly coupled to the transmission, and the rear wheels as the sub-driving wheels coupled to the transmission through the transfer clutch. However, the disclosure is not limited thereto, but may be applied to a vehicle including rear wheels as main driving wheels and a vehicle transmitting a driving force to front and rear wheels with the use of a center differential.

(2) In the embodiment, the travel power source of the vehicle is, for example, an engine, or an internal combustion engine. However, the travel power source of the vehicle is not limited thereto. The disclosure is applicable to, for example, an engine-electric hybrid system or an electric vehicle using only an electric motor as a travel power source.

(3) For example, the driving stiffness or the braking stiffness of the tire, the vehicle body slip angle, the tire slip angle, and the tire vertical load to be used in the estimation of the driving forces may be calculated on-board by a processor mounted on the vehicle, but the disclosure is not limited thereto. A map generated based on a calculation result prepared in advance may be held in a storage medium. Necessary parameters may be read out from the map based on the travel state of the vehicle, e.g., the vehicle speed, the steering angle, the yaw rate, and the acceleration rate.

The engine control unit 110, the transmission control unit 120, and the driving force distribution control unit 130 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the engine control unit 110, the transmission control unit 120, and the driving force distribution control unit 130. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the engine control unit 110, the transmission control unit 120, and the driving force distribution control unit 130 illustrated in FIG. 1.

The invention claimed is:

1. A driving force estimation apparatus to be applied to a vehicle, the vehicle being configured to drive front wheels and rear wheels of the vehicle, the driving force estimation apparatus being configured to estimate a driving force of the front wheels and a driving force of the rear wheels, and the driving force estimation apparatus comprising:
   a free rolling rotation speed output unit configured to output a free rolling rotation speed of the front wheels and a free rolling rotation speed of the rear wheels in a free rolling state devoid of a braking force or a driving force;
   an actual rotation speed detector configured to detect an actual rotation speed of the front wheels and an actual rotation speed of the rear wheels;
   a slip rate calculation unit configured to calculate a slip rate of the front wheels and a slip rate of the rear wheels, from the free rolling rotation speed of the front wheels, the free rolling rotation speed of the rear wheels, the actual rotation speed of the front wheels, and the actual rotation speed of the rear wheels;
   a driving force estimation unit configured to estimate the driving force of the front wheels and the driving force of the rear wheels with use of driving stiffnesses or braking stiffnesses of the front wheels, driving stiffnesses or braking stiffnesses of the rear wheels, the slip rate of the front wheels, and the slip rate of the rear wheels;
   a slip angle output unit configured to output a slip angle of the front wheels and a slip angle of the rear wheels; and
   a stiffness correction unit configured to correct the driving stiffnesses or the braking stiffnesses of the front wheels and the driving stiffnesses or the braking stiffnesses of the rear wheels to be used in estimating the driving force of the front wheels and the driving force of the rear wheels by the driving force estimation unit, in accordance with the slip angle of the front wheels and the slip angle of the rear wheels outputted by the slip angle output unit.

2. The driving force estimation apparatus according to claim 1, further comprising a transfer torque estimation unit, wherein
   the vehicle comprising:
      a front wheel driving force transmission mechanism configured to transmit the driving force of the front wheels to the front wheels;
      a rear wheel driving force transmission mechanism configured to transmit the driving force of the rear wheels to the rear wheels; and
      a transfer clutch that restricts a difference in a rotation speed between the front wheel driving force transmission mechanism and the rear wheel driving force transmission mechanism,
   the transfer torque estimation unit is configured to estimate transmission torque of the transfer clutch, and
   the driving force estimation unit is configured to correct respective estimated values of the driving force of the front wheels and the driving force of the rear wheels in accordance with the transmission torque estimated by the transfer torque estimation unit.

3. The driving force estimation apparatus according to claim 2, wherein
   the transfer torque estimation unit is configured to estimate the transmission torque, based on a first difference between the actual rotation speed of the front wheels and the actual rotation speed the rear wheels, and a second difference between the free rolling rotation speed of the front wheels and the free rolling rotation speed of the rear wheels.

4. The driving force estimation apparatus according to claim 3, wherein
   the transfer torque estimation unit is configured to estimate the transmission torque, based on a value obtained by dividing a difference between the first difference and the second difference by the first difference.

5. The driving force estimation apparatus according to claim 1, further comprising one or both of:
   a driving force distribution control change unit configured to change a driving force distribution control between the front wheels and the rear wheels, based on the driving force of the front wheels and the driving force of the rear wheels estimated by the driving force estimation unit; and
   a driving force data output unit configured to offer the driving force of the front wheels and the driving force of the rear wheels estimated by the driving force estimation unit to an occupant of the vehicle.

6. The driving force estimation apparatus according to claim 2, further comprising one or both of:
   a driving force distribution control change unit configured to change a driving force distribution control between the front wheels and the rear wheels, based on the driving force of the front wheels and the driving force of the rear wheels estimated by the driving force estimation unit; and
   a driving force data output unit configured to offer the driving force of the front wheels and the driving force of the rear wheels estimated by the driving force estimation unit to an occupant of the vehicle.

7. The driving force estimation apparatus according to claim 3, further comprising one or both of:
   a driving force distribution control change unit configured to change a driving force distribution control between the front wheels and the rear wheels, based on the driving force of the front wheels and the driving force of the rear wheels estimated by the driving force estimation unit; and
   a driving force data output unit configured to offer the driving force of the front wheels and the driving force of the rear wheels estimated by the driving force estimation unit to an occupant of the vehicle.

8. The driving force estimation apparatus according to claim 4, further comprising one or both of:
   a driving force distribution control change unit configured to change a driving force distribution control between the front wheels and the rear wheels, based on the driving force of the front wheels and the driving force of the rear wheels estimated by the driving force estimation unit; and
   a driving force data output unit configured to offer the driving force of the front wheels and the driving force of the rear wheels estimated by the driving force estimation unit to an occupant of the vehicle.

9. A driving force estimation apparatus to be applied to a vehicle, the vehicle being configured to drive front wheels and rear wheels of the vehicle, the driving force estimation apparatus being configured to estimate a driving force of the front wheels and a driving force of the rear wheels, and the driving force estimation apparatus comprising:

an actual rotation speed sensor configured to detect an actual rotation speed of the front wheels and an actual rotation speed of the rear wheels; and circuitry configured to output a free rolling rotation speed of the front wheels and a free rolling rotation speed of the rear wheels in a free rolling state devoid of a braking force or a driving force, calculate a slip rate of the front wheels and a slip rates of the rear wheels, from the free rolling rotation speed of the front wheels, the free rolling rotation speed of the rear wheels, the actual rotation speed of the front wheels, and the actual rotation speed of the rear wheels, estimate the driving force of the front wheels and the driving force of the rear wheels with use of driving stiffnesses or braking stiffnesses of the front wheels, driving stiffnesses or braking stiffnesses of the rear wheels, the slip rate of the front wheels, and the slip rate of the rear wheels, output a slip angle of the front wheels and a slip angle of the rear wheels, and correct the driving stiffnesses or the braking stiffnesses of the front wheels and the driving stiffnesses or the braking stiffnesses of the rear wheels to be used in estimating the driving force of the front wheels and the driving force of the rear wheels, in accordance with the slip angle of the front wheels and the slip angle of the rear wheels.

\* \* \* \* \*